Nov. 25, 1941.   P. J. McCULLOUGH   2,264,094
ELECTRIC COOKER
Filed Jan. 15, 1940   2 Sheets-Sheet 1
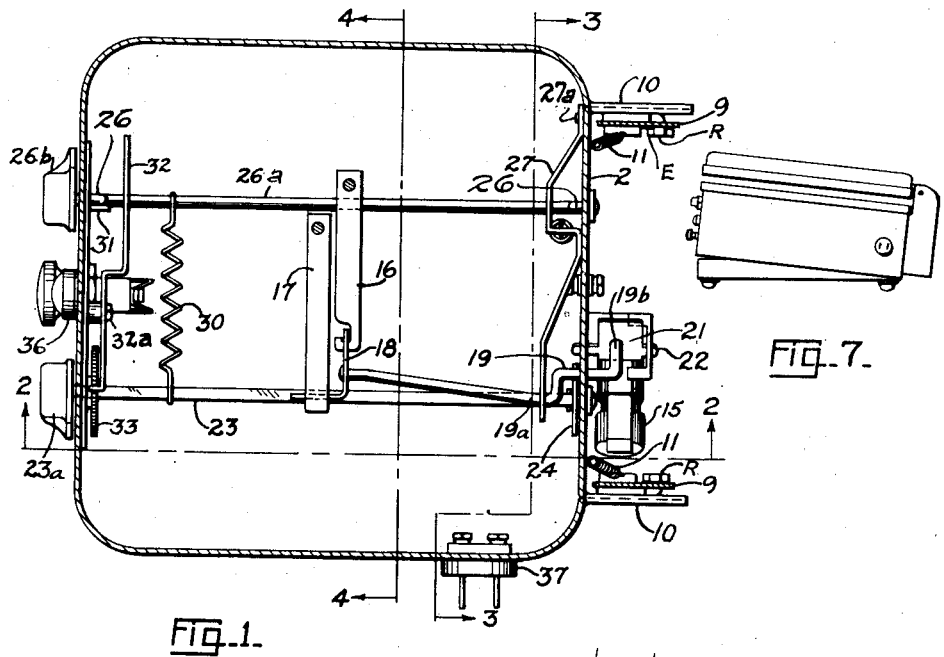
Fig. 1.
Fig. 7.
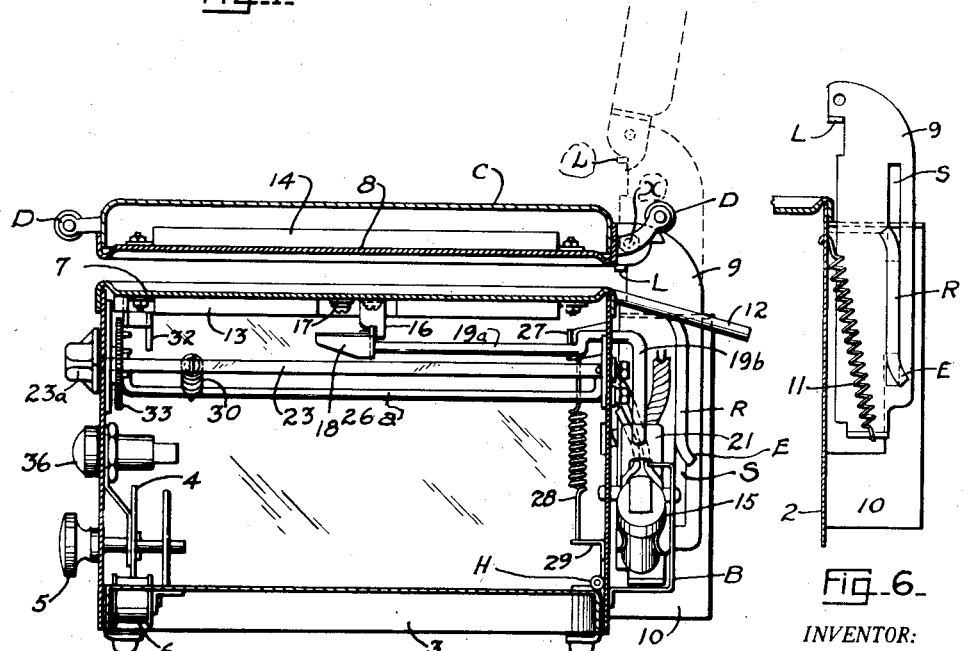
Fig. 2.
Fig. 6.
INVENTOR:
PAUL J. McCULLOUGH
BY
Rodney Bedell
ATTORNEY Nov. 25, 1941.   P. J. McCULLOUGH   2,264,094
ELECTRIC COOKER
Filed Jan. 15, 1940   2 Sheets-Sheet 2

INVENTOR
PAUL J. McCULLOUGH
BY
Rodney Bedell
ATTORNEY

Patented Nov. 25, 1941

2,264,094

UNITED STATES PATENT OFFICE 2,264,094

ELECTRIC COOKER

Paul J. McCullough, St. Louis, Mo., assignor to Joseph Pavelka, St. Louis, Mo.

Application January 15, 1940, Serial No. 313,857

7 Claims. (Cl. 219—19)

The invention relates to electric cookers and more particularly to electric grills for cooking sausages, steaks, sandwiches and the like, waffle bakers and similar devices.

One object of the invention is to arrange upper and lower cooking sheets so they may be moved relative to each other to accommodate between them different thicknesses of food units being cooked and to facilitate insertion, inspection and removal of the food units.

Another object is to automatically maintain a predetermined temperature of the cooking sheets.

Another object is to vary the temperature of the cooking sheets by a thermostatic control.

Another object is to avoid arcing in an electric circuit switch actuated by a thermostatic device.

Another object is to prevent a change in the setting of the temperature control unless the heater circuit is open.

Another object is to facilitate the discharge of excess grease from the lower cooking sheet.

Another object is to construct an electric cooker with the features referred to above so simply that it will have a low first cost and will withstand careless or unskilled handling without injury.

Other objects and advantages will be apparent to those skilled in the art from the following descriptions wherein reference is made to the accompanying drawings in which like numerals designate like parts throughout the several views.

In the drawings

Figure 1 is a horizontal section through the cooker body with its cooking plate removed to clearly illustrate the control mechanism.

Figure 2 is a complete vertical section taken on the line 2—2 of Figure 1.

Figure 3:
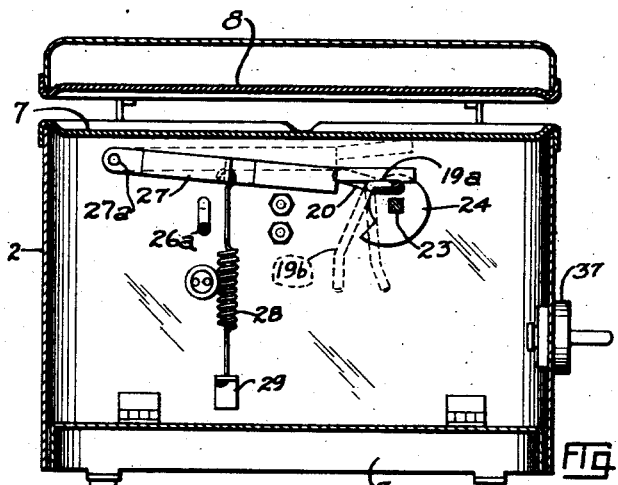
Figure 4:
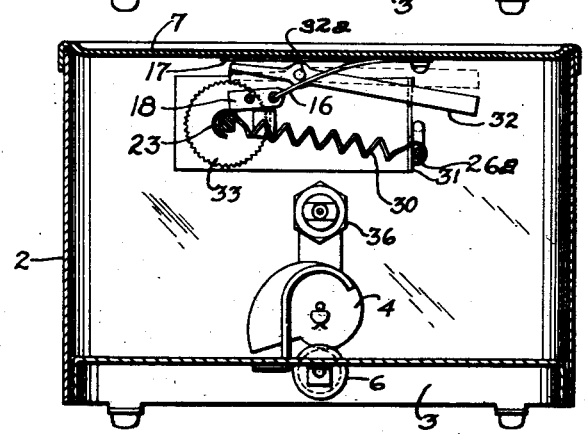

Figures 3 and 4 are complete vertical sections taken on the lines 3—3 and 4—4 respectively of Figure 1.

Figure 5:
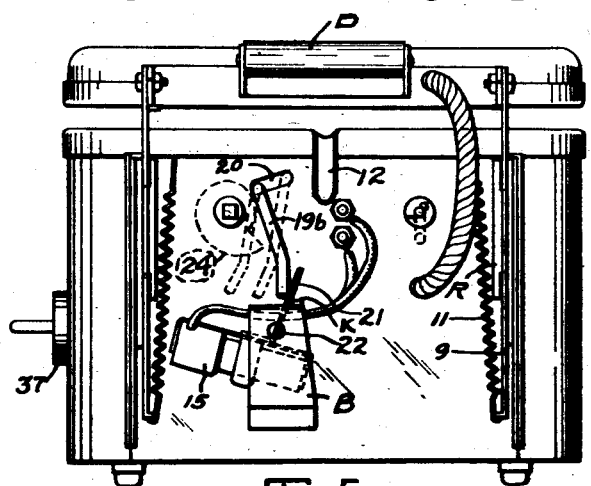

Figure 5 is a rear elevation of the cooker.

Figure 6 is a detail of the cover support.

Figure 7 is a side view showing the cooker body in a tilted position.

Figure 8:
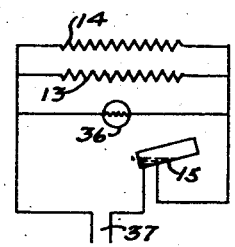

Figure 8 is a wiring diagram.

The cooker main housing 2 is hinged at H to a base 3 so as to swing from the normal position indicated in Figure 2 to the tilted position indicated in Figure 7. Such movement may be effected by a cam 4 (Figure 4) journalled on the front wall of the housing and operated manually by a knob 5 (Figure 2). The cam engages a roller 6 journalled on base 3 and as the cam is rotated housing 2 swings to and from base 3.

A lower cooking sheet 7 extends across the top of housing 2 and may be heated by an electric resistance element indicated at 13. A spout 12 projects rearwardly from lower cooking plate 7 and will drain any surplus grease on the cooking plate to a separate receptacle provided therefor at the rear of the cooker. If the surplus grease is too thick to drain readily or if the cooker happens to be standing on a table or counter which slopes forwardly instead of being level, then the operator may tilt the cooker housing and top plate by rotating knob 5 to effect more rapid drainage.

Flanges 10 project rearwardly from housing 2 and carry vertical rails R extending parallel to the rear wall of housing 2. A cover member C mounting the upper cooking sheet 8 is pivoted at X to legs 9 which have elongated slots slidably receiving rails R, the ends E of which are bent to overlap legs 9. The user may grasp handles D to raise the cover and its legs bodily from the full line position shown in Figure 2 to the dotted line position, and in any vertical position of the legs the cover may be swung about its pivot X from the horizontal position shown in full line position in Figure 2 to the dotted line position. The tilting of legs 9 by the weight of cover C will hold the cover in any vertical adjusted position. Springs 11 are tensed between the housing wall and the lower ends of legs 9 to contribute to the support of the cover and to prevent shock when the cover is lowered. Lugs L on legs 9 engage the cover to hold it in horizontal or upright position as desired.

Heating elements 13 and 14 are connected in parallel as indicated in the wiring diagram of Figure 8 and their circuit includes a tilting mercury switch 15 which may be controlled by a thermostat device comprising two bimetal strips 16 and 17, both secured at adjacent ends to the bottom of cooking plate 7 with their outer ends free to move as induced by temperature changes. When cooking sheet 7 is relatively cool, strip 17 lies against the bottom of sheet 7 and strip 16 is curved downwardly, as indicated in Figure 4. As cooking sheet 7 heats up, the free end of thermostat 17 moves away from sheet 7 and strip 16 moves towards sheet 7.

A crank 19 (Figure 1) extends through a slot 20 (Figures 3 and 5) in the housing rear wall and has an offset arm 19a secured to a lever 18 (Figure 1) pivoted at one end to the free end of thermostat 16 and having its other end flanged and underlying the free end of thermostat 17. Crank 19 has a depending arm 19b arranged to engage a finger 21 on switch 15 and pivotally mounting the switch at 22 to a bracket B attached to housing 2. Pivot 22 is so disposed relative to the center of gravity of the switch that the switch tends to tilt in an anticlockwise direction to the position shown in Figure 8 in which the mercury closes the heat circuit.

When both thermostats are cool, they have no effect upon the positioning of crank shaft 19, 19a, 19b, and the switch will remain in the circuit closing position except for a manual control described below. As the thermostats heat, the outer end of strip 16 and the corresponding end of lever 18 move upwardly, and the outer end of strip 17 moves downwardly engaging the corresponding end of lever 18. These opposite movements of the ends of the lever turn the lever in an anticlockwise direction (Figure 4) and also turn the crank shaft, which is rigid therewith, so that its depending arm 19b tilts switch 15 in a clockwise direction to open the heater circuit.

Bracket B has a lug K which engages finger 21 to limit pivotal movement of switch 15 in a clockwise direction during shipment or rough handling of the cooker.

A shaft 23 extending between and journalled on the front and rear walls of housing 2 is manually actuated by knob 23a and at its rear end mounts a cam 24 (Figures 3 and 5). This cam is disposed adjacent to shaft 19 and rotation of the cam from the low position indicated in Figure 5 will move shaft 19 to the right in slot 20. The inclination of the slot is such that if cam 24 is moved from its high position to its low position, crank 19 will slide down the slot to the full line position shown in Figure 5.

Elements 23, 23a, and 24 comprise an adjustment feature whereby the heating of the cooking plates may be controlled. Obviously, less rotary movement of crank arm 19b is required to tilt the switch from closed to open position when the crank is pivoting about the right-hand end of slot 20 than when the crank is pivoting about the left-hand end of slot 20. Hence, maximum relative movement of the free ends of thermostats 16 and 17 is required in opening the heater circuit when cam 24 is in the position shown in Figures 3 and 5.

The circuit may be opened and closed manually by a crank shaft having ends 26 journalled in the front and rear walls of the housing (Figure 1) and having an intermediate offset portion 26a which may be moved from the lowermost position, indicated in Figure 3, 180 degrees to an opposite uppermost position. This movement is effected through a knob 26b secured to the forward end of the crank shaft. A lever 27 has one end pivoted at 27a to the rear wall of the housing and has its other end overlying the offset portion 19a of crank shaft 19. A spring 28 tends to pull lever 27 downwardly, as shown in Figure 3, in which position its swinging end presses downwardly on the offset portion 19a of crank shaft 19 to rotate the latter to the full line position shown in Figure 5 to open the heater circuit. When crank shaft 26 is rotated 180 degrees by knob 26b, its offset portion 26a lifts lever 27 against the pull of spring 28 and frees crank shaft 19 from the lever, permitting the heavy end of switch 15 to swing crank shaft arm 19b to the left from the position shown in Figure 5 and closing the circuit but subject to control by the thermostat device regulated by knob 23a.

A tension spring 30 has one end attached to shaft 26a and the other end attached to shaft 23. The pull of the spring tends to hold crank shaft 26 in on or off position with its forward crank in engagement with a stop 31 (Figure 9) on the housing front wall. The friction between the spring and square shaft 23 tends to hold the latter and cam 24 in any adjusted position.

It is desired that the adjustment of the thermostat control cannot be changed accidentally, as by the brushing of the attendant's clothing against knob 23a. Also, it is desired that the adjustment of the thermostat control cannot be changed intentionally while the circuit is closed, otherwise there might be a coincidental automatic operation of the crank shaft 19 and adjusting shaft 23 which might result in arcing between the switch contacts. To this end, shaft 23 is locked against rotation when crank shaft 26 and knob 23a are in circuit closing position. The lock comprises a toothed wheel 33 (Figure 4) secured to shaft 23 and a lever 32 pivoted at 32a to the front wall of the housing and having one end disposed to interengage with the teeth of wheel 33. When crank shaft 26 is in the position shown in Figures 3 and 4 in which it permits the switch to close and to be controlled by thermostats 16 and 17, lever 32 assumes the full line position shown in Figure 4 with its left-hand end spaced from wheel 33. When crank shaft 26 is turned 180 degrees to the circuit opening position, its offset portion 26a will lift lever 32 to the dotted line position shown in Figure 4, and the forward end of the lever will engage wheel 33 to hold the same against rotation.

An electric plug 37 is provided on housing 2 whereby heating elements 13 and 14 may be connected to a power source. Also, an indicator lamp 36 is arranged in housing 2 and connected in parallel with heating elements 13 and 14 and in series with switch 15, as shown in Figure 8, to indicate flow of current through the heating circuit. Obviously, lamp 36 will be illuminated when switch 15 is in closed circuit position and the lamp will be unlighted when switch 15 is in open circuit position.

The electric cooker described above operates as follows:

To heat cooking sheets 7 and 8, knob 26b is moved manually to closed circuit position whereby crank offset 26a moves lever 27 out of engagement with crank offset 19a (Fig. 3), thus permitting switch 15 to pivot under the influence of gravity to closed circuit position. As cooking sheets 7 and 8 become heated, lever 18 and crank shaft 19 are pivoted by strips 16 and 17 and, when the cooking sheets attain a desired temperature as determined by the thermostat control setting, depending arm 19b pivots switch 15 into open circuit position, thus automatically stopping the flow of current to heating elements 13 and 14 and stopping further heating of cooking sheets 7 and 8.

As lower cooking sheets 7 cools again, crank shaft 19 and lever 18 pivot in the reverse direction to release switch 15 and to allow the switch to move to closed circuit position under the influence of gravity, in which position the switch remains until the desired temperature of the cooking sheets is attained again.

Cooking sheets 7 and 8 may be maintained at any temperature desired by changing the setting of thermostat control knob 23a to rotate cam 24 which moves crank shaft 19 in slot 20 and shifts the position of depending arm 19b relative to switch 15.

When the manually controlled switch knob 26b is in closed circuit position, lever 32 engages wheel 33 on shaft 23 and prevents movement of knob 26b and change in the setting of the thermostat control.

The movement of thermostats 16 and 17 in opposite directions produces more rapid rotation of lever 18 than would be effected if the lever had only a single actuating thermostat. The rotation of the lever is further accelerated by the fact that as thermostat 16 approaches the lower heating sheet, it is subjected to a gradually increasing temperature and therefore moves more rapidly and tends to open the circuit more promptly upon the attainment of a predetermined critical temperature in the sheet. Similarly, after the circuit is opened and cold batter is poured onto the sheet, the temperature of the cooking plate is lowered and the return movement of thermostat 17 will be accelerated as the thermostat approaches and contacts with the plate. Hence, the closing of the circuit will be accelerated as the temperature drops substantially below the predetermined critical point. This action would be particularly noticeable and advantageous in a waffle iron following the removal of a cooked waffle.

From the above description, it will be apparent that the cooking sheets of an electric cooker utilizing an electrical control system constructed according to this invention, will be maintained effectively at a predetermined temperature. Also, after the thermostat control is regulated so that the cooking sheets are maintained at a desired temperature, the setting of the thermostat control cannot be changed accidentally by the operator's brushing against the control knob. In addition, the cooking sheet of a cooker of the kind described herein may be freed of excess grease and other liquid substances quickly and easily. Also, the cooker is cheap to manufacture, simple in design and effective in operation.

While only one embodiment of this invention has been shown and described, it should be understood that other forms and arrangements may be used without departing from the scope of this invention as defined in the appended claims. For instance, an electrical control system as described herein may be used otherwise than on electric cookers, and the control system may be utilized whenever temperature regulation is desired.

I claim:

1. In an electrical heating device, a housing, a switch member pivotally mounted on said housing to open and close the electric circuit, a crank shaft resting on an elongated bearing inclined so that the relation between said shaft and switch pivot varies as said shaft moves along said bearing, said shaft having an arm in operative connection with said switch member, a manually adjustable cam for positioning said shaft along said bearing to vary the throw of said arm relative to said switch, and a thermostatic device to actuate said shaft.

2. In an electrical heating device, a housing, a switch member pivotally mounted on said housing to open and close the electric circuit, a crank shaft resting on an elongated bearing inclined so that the relation between said shaft and switch pivot varies as said shaft moves along said bearing, said shaft having an arm at one end in operative connection with said switch member, a manually adjustable cam for positioning said shaft along said bearing to vary the throw of said arm relative to said switch, a lever fixed to said shaft at a point spaced from said arm, a pair of bimetallic strips anchored to said housing with the free ends of said strips moving in opposite directions in substantially parallel adjacent paths as the temperature of the strips increases, the moving ends of said strips engaging opposite ends of said lever to rotate said crank on said bearing to control the action of said switch.

3. In a cooker, a cooking sheet, an electric resistance element for heating said sheet, a thermostat control to regulate the temperature of said sheet, said thermostat control including a fluid contact switch connected electrically in series with said heater element to tilt free of resistance, other than its inertia, in opposite directions into circuit opening and circuit closing positions, a pair of bimetallic thermostatic strips disposed substantially parallel to each other and extending from end to end alongside of said sheet with an adjacent pair of their end portions in fixed relation to said sheet, one strip having its high expansion element opposing said sheet and the other strip having its low expansion element opposing said sheet so that said strips distort in opposite directions when subjected to a change in temperature, and an operative connection between said switch and the other unfixed end portions of said strips whereby the opposite movements of the latter-mentioned end portions tilt the switch from one of its said positions to the other when the strips are subject to temperature changes.

4. A device as described in claim 3 in which the connection between the switch and the thermostatic strips includes a shaft having a crank connection to the unfixed end portions of both of said strips, whereby the shaft is rotated as said strips move in opposite directions.

5. In a cooker, a cooking sheet, an electric resistance element for heating said sheet, a circuit including a switch for said element, a pair of elongated thermostatic strips with anchored ends and with movable ends operatingly connected to said switch to move it from one position to another, said strips being adapted to bend in opposite directions when heated and to bend in opposite directions when cooled and being disposed throughout their length alongside of said cooking sheet whereby as said cooking sheet approaches a critical temperature one strip moves towards said sheet to be in substantial contact therewith from end to end of the strip and the other strip moves away from said sheet.

6. In an electric control system, a fluid contact switch mounted to tilt freely from a circuit closing to a circuit opening position, a pair of bimetallic strips having respective portions arranged to move in opposite directions when subjected to a change in temperature, a bar extending transversely of said portions with its ends disposed for engagement by said portions, a shaft extending transversely of said bar and fixed thereto and being freely rotatable about its axis by the opposite movement of the ends of said bar by said portions, said shaft having a crank arm arranged to tilt said switch into one of said positions when said bar is shifted in one direction by said strips, said switch being arranged to return by gravity to its other position when released from said crank arm by the reverse movements of said strips.

7. In a cooker of the type described, a substantially horizontal cooking plate, thermostatic strips extending alongside of said plate and each other with portions arranged to move in opposite directions when heated and in opposite directions when cooled, a substantially upright wall-like member spaced from said thermostat portions, a fluid switch adjacent said member, a shaft extending transversely of said member and pivoted to rotate freely thereon and having a crank arm operatively connected to said switch to tilt the latter about a pivot and having a lever extending transversely of and in opposite directions from the shaft axis, the ends of said lever being connected respectively to the thermostat portions whereby the crank is rotated by the movement of said thermostat portions in opposite directions to operate said switch free of any resistance by said shaft and said switch other than their inertia.

PAUL J. McCULLOUGH.